United States Patent
Rothbarth et al.

(10) Patent No.: US 7,356,535 B2
(45) Date of Patent: Apr. 8, 2008

(54) METHOD AND SYSTEM FOR SHARING STORAGE SPACE ON A COMPUTER

(75) Inventors: James N. Rothbarth, St. Louis, MO (US); Paul Becker, Eureka, MO (US)

(73) Assignee: PB & J Software, LLC, St Louis, MO (US)

( * ) Notice: Subject to any disclaimer, the term of this patent is extended or adjusted under 35 U.S.C. 154(b) by 179 days.

(21) Appl. No.: 10/814,683

(22) Filed: Mar. 31, 2004

(65) Prior Publication Data

US 2005/0021950 A1 Jan. 27, 2005

Related U.S. Application Data

(63) Continuation-in-part of application No. 10/682,355, filed on Oct. 9, 2003, now Pat. No. 7,310,736.

(60) Provisional application No. 60/417,448, filed on Oct. 10, 2002.

(51) Int. Cl.
*G06F 7/00* (2006.01)

(52) U.S. Cl. ............................................. 707/10; 707/9
(58) Field of Classification Search ................ 707/204, 707/1–10, 200, 206
See application file for complete search history.

(56) References Cited

U.S. PATENT DOCUMENTS

| | | | |
|---|---|---|---|
| 5,659,614 A * | 8/1997 | Bailey, III | 713/165 |
| 6,047,294 A | 4/2000 | Deshayes et al. | |
| 6,049,874 A * | 4/2000 | McClain et al. | 713/176 |
| 6,195,695 B1 | 2/2001 | Cheston et al. | |
| 6,219,669 B1 * | 4/2001 | Haff et al. | 707/10 |
| 6,411,943 B1 | 6/2002 | Crawford | |
| 6,422,943 B2 | 7/2002 | Shinohara et al. | |
| 6,546,474 B1 | 4/2003 | Weigelt | |
| 6,735,623 B1 | 5/2004 | Prust | |
| 2002/0188461 A1 * | 12/2002 | Matsumoto | 705/1 |
| 2003/0154192 A1 * | 8/2003 | Laborde et al. | 707/3 |
| 2003/0172094 A1 * | 9/2003 | Lauria et al. | 707/206 |

* cited by examiner

*Primary Examiner*—Wilson Lee
(74) *Attorney, Agent, or Firm*—Senniger Powers LLP

(57) ABSTRACT

An application and method for transmitting copies of data to a remote back-up site for storage, and for retrieving copies of the previously stored data from the remote back-up site. A user designates files from an originating computer for which to transfer copies to a destination computer. The originating computer transfer designated data to portable computer readable medium for storage. The portable medium is physically delivered to the destination user. The destination user uploads the stored data to the destination computer. The destination computer authenticates the uploaded data. If the data is authenticated, the destination computer stores copies of the designated files.

18 Claims, 17 Drawing Sheets

140

142

215

217

221

225

321

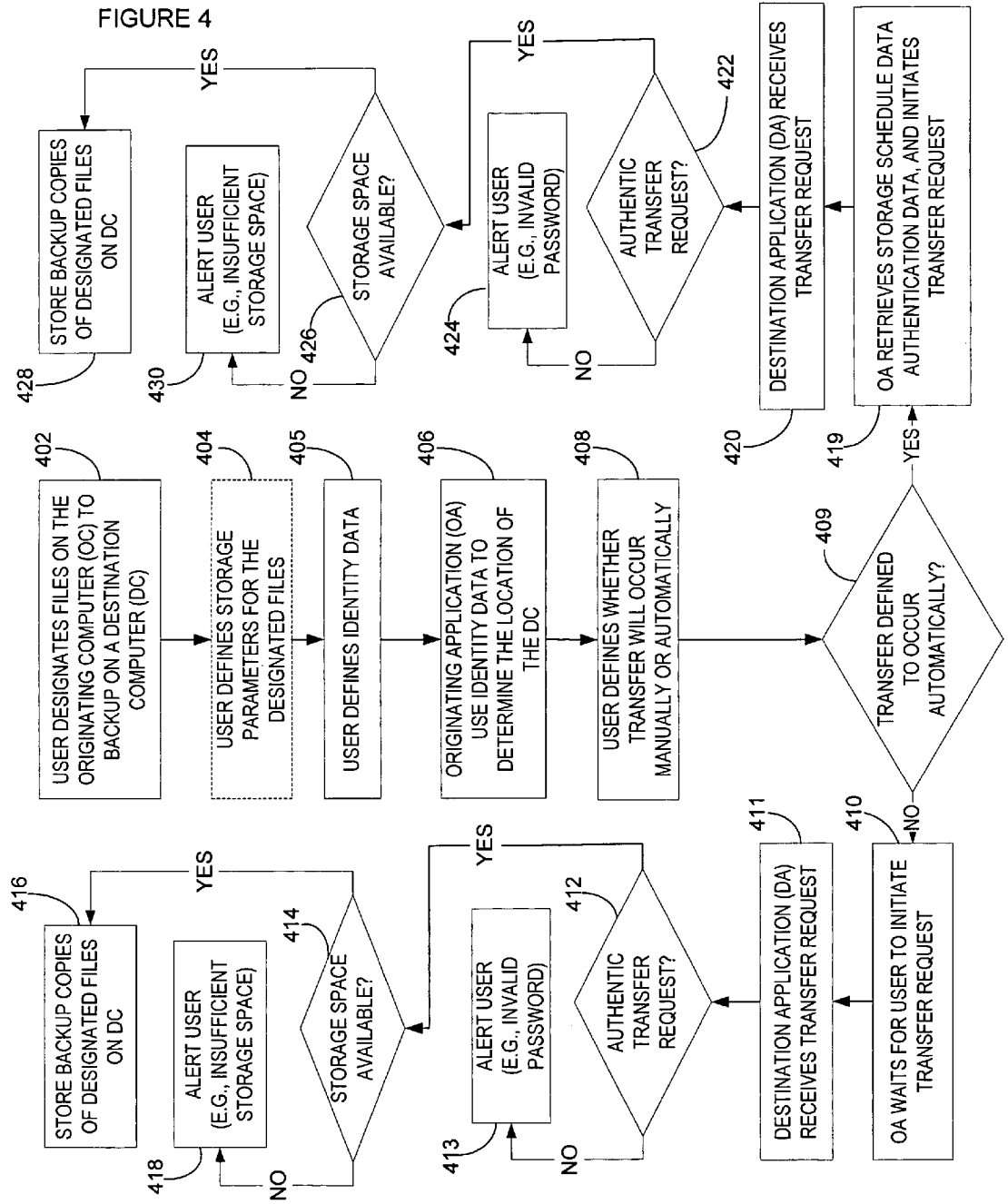

METHOD AND SYSTEM FOR SHARING STORAGE SPACE ON A COMPUTER

CROSS REFERENCE TO RELATED APPLICATIONS

This application is a continuation-in-part of application No. 10/682,355; filed Oct. 9, 2003 now U.S. Pat. No. 7,310,736.

FIELD OF THE INVENTION

The invention relates to a system and method in which two or more users back-up computer files by agreeing to share storage space on the their computers. In particular, the invention relates to a system and method for selectively transferring encrypted copies of files from an originating computer to storage space on a destination computer.

BACKGROUND OF THE INVENTION

It is common practice for computer users to store computer file data on computer readable medium (CRM) such as CD-ROMs, digital versatile disks (DVD), magnetic cassettes, magnetic tape, magnetic disk storage, or magnetic hard disk drives. However, data stored on such storage devices can be lost due to fire, flood, theft, or any other event that adversely affects the storage medium. Therefore, it is often wise to generate a back-up copy of computer file data for storage at an off-site location in order to prevent destruction of both the original data and the back-up copy by the same catastrophic event.

However, current methods of generating and maintaining back-up copies of file data are often inefficient. For example, some existing back-up operations involve creating a copy of all the data stored on the CRM. Although this method provides complete protection, it can be time consuming and can cause unnecessary wear on the mechanical components of the disk drive. Moreover, storage space could be saved at the back-up site by allowing the user at the origination site to designate one or more files for storage at a destination site.

Some systems require physically transporting the storage medium containing the back-up copy to the back-up site. Such transportation may lead to further expense and opportunities for media damage. In addition, these prior methods do not provide an efficient system and method for retrieving the stored data from the off-site location.

Moreover, prior online data storage systems are located at known sites on the Internet, and are therefore vulnerable to attack from malicious persons (i.e., hackers) attempting to access and/or modify data stored on such systems. In particular, these existing storage systems do not allow computer users to communicate with other computer users via a communication network, such as the Internet, for the purpose of storing back-up data on the other's computer.

Thus, the need exists for a method and system for securely transmitting copies of data to a remote back-up site for storage, for retrieving copies of the previously stored data from the remote back-up site, and for verifying the transported data. A need also exists for a back-up system in which additional equipment is not required and one or more users share storage space on their computers. A need also exists to make it more difficult, if not impossible, for malicious users to identify a remote back-up site for particular users.

SUMMARY OF THE INVENTION

The invention meets the above needs and overcomes one or more deficiencies in the prior art by providing an improved application and method for securely transmitting copies of data to a remote back-up site for storage. In one embodiment, the invention utilizes an application that allows a user to predefine a schedule for automatically transmitting encrypted copies of files from an originating computer to a selected destination computer for storage. By predefining a schedule for transmitting encrypted copies of files to the destination computer, the invention allows encrypted copies of files to be transmitted without affecting user experience on either computer. In other words, the transfer of encrypted copies of files from the originating computer to the destination computer can occur automatically, and without the users of either computer being aware that the transfer is occurring. The features of the present invention described herein are less laborious and easier to implement than currently available techniques as well as being economically feasible and commercially practical In accordance with one aspect of the invention, a method is provided for facilitating the transfer of back-up copies of one or more files portable computer readable medium from a first computer to a second computer. The method includes designating files from the first computer for which back-up copies will be transferred to the second computer. The method includes transferring the files from the first computer to a portable computer readable medium. The method also includes delivering the portable computer readable medium to the destination user. The method further includes transferring the files from the delivered portable computer readable medium to the second computer for storage.

In accordance with another aspect of the invention, a method is provided method for facilitating the transfer of back-up copies of one or more files from a first computer to a second computer. The method includes designating files from the first computer for which back-up copies will be transferred to the second computer. The method includes identifying a location of the second computer. The method includes transferring the files from first computer to a portable computer readable medium. The method includes selectively delivering the portable computer readable medium to a user of the destination computer based on a total size of the files being transferred. The portable computer readable medium is delivered to the destination user when the total size of the files is greater than or equal to a predetermined file size. The method includes selectively transferring the files from the first computer to the second computer via a communication network when the total size of the files is less than the predetermined file size.

Alternatively, the invention may comprise various other methods and apparatuses.

Other features will be in part apparent and in part pointed out hereinafter.

BRIEF DESCRIPTION OF THE DRAWINGS

FIG. 4 is an exemplary flow diagram illustrating a method for transferring copies of files from an originating computer to a destination computer according to one preferred embodiment of the invention.

Corresponding reference characters indicate corresponding parts throughout the drawings.

DETAILED DESCRIPTION OF THE INVENTION

Figure 1:
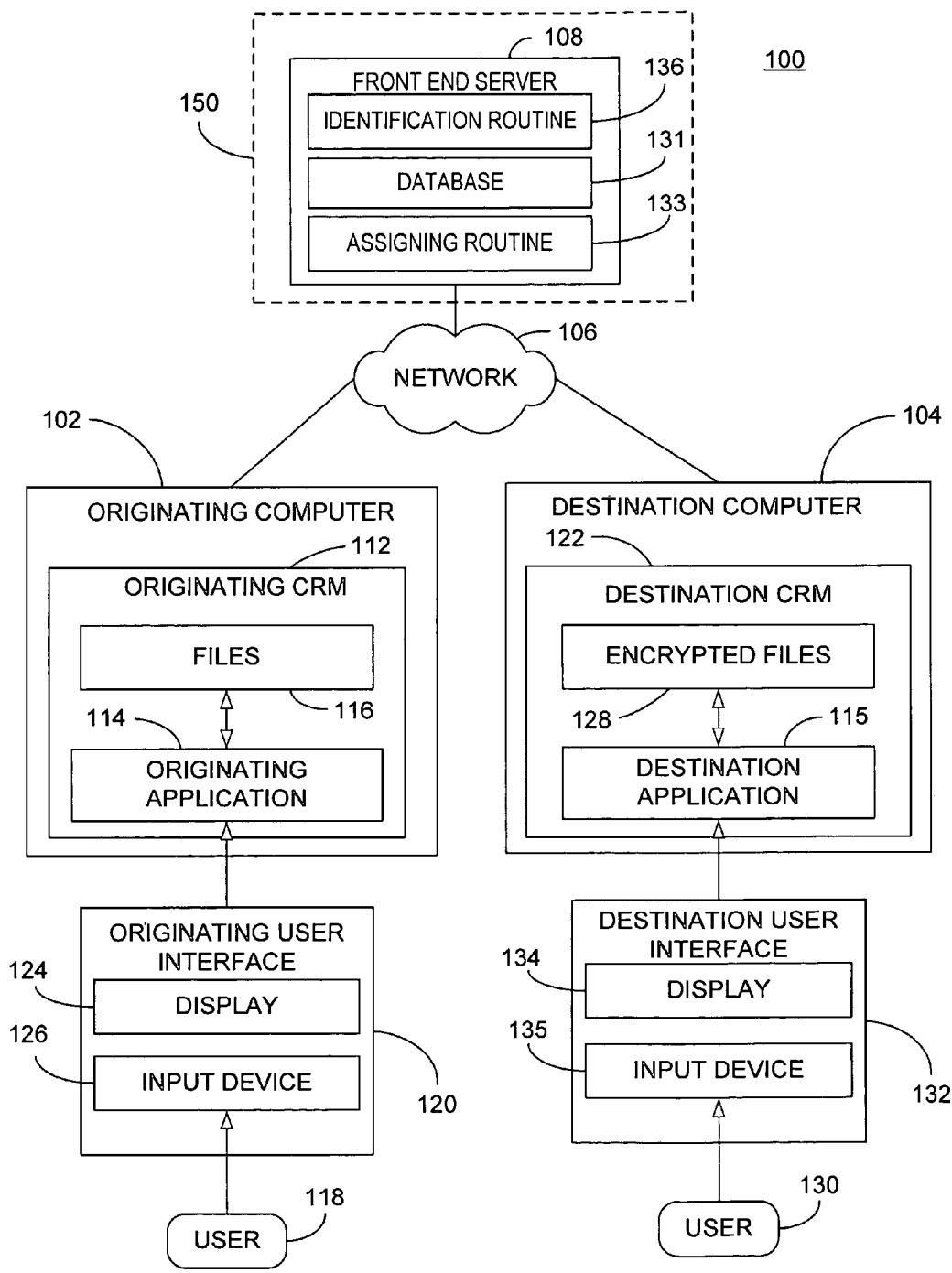
FIG. 1 is a block diagram illustrating a back-up system wherein copies of files stored on an originating computer are encrypted and transferred to a destination computer.

Referring first to FIG. 1, an exemplary block diagram illustrates a back-up system 100 for transferring copies of files from an originating computer 102 to a destination computer 104. The originating computer 102 and destination computer 104 are coupled to a data communication network 106 such as the Internet (or the World Wide Web) to allow the originating computer 102 and destination computer 104 to communicate. In the example of FIG. 1, the invention employs an application that allows a user to designate files from the originating computer for which back-up copies will be transferred to the destination computer 104, and allows the originating computer 102 to retrieve back-up files from the destination computer 104. The application of the invention also allows the originating computer to receive back-up copies of files from the destination computer 104.

The originating computer 102 is linked to an originating computer-readable medium (CRM) 112. The originating CRM 112 contains an originating application 114, and stores one or more files 116. An originating user 118, using an originating user-interface (UI) 120 linked to the originating computer 102 designates one or more files 116 stored on the originating CRM 112 for which to transfer copies to a destination CRM 122 for storage. For example, the UI 120 may include a display 124 such as a computer monitor for viewing forms requesting input from the user, and an input device 126 such as a keyboard or a pointing device (e.g., a mouse, trackball, pen, or touch pad) for entering data into such an input form.

The destination computer 104 is linked to a destination CRM 122. The destination CRM 122 contains a destination application 115, and may store one or more encrypted files 128 previously transferred from the originating CRM 112. A destination user 130 using a destination UI 132 linked to the destination computer 104 allocates the originating user 118 an amount of storage space on the destination CRM 122. For example, after the destination user 130 has agreed to become a storage partner with the originating user 118, the destination user 130 use an input device 135 to enter data into an input form being displayed on the destination display 134 to allocate the originating user 118 10 megabytes of storage space on the destination CRM. Alternatively, the destination user 130 may allocate the originating user 118 all of the storage space on the destination CRM 122 (e.g., an entire hard drive). Notably, the originating application 114 and the destination application 115 are the same application. In other words, the application of the invention possesses dual functionality to allow the same application to be used on both the originating computer 102 and the destination computer 104.

In one embodiment, a front end server (server) 108, also referred to as "web server" or "network server," is also coupled to the communication network 106, and allows communication between the server 108 and the originating computer 102, and between the server 108 and the destination computer 104. In this example, the originating computer 102 and the destination computer 104 download the originating application 114 and destination application 115, respectively, from the server 108 using the File Transfer Protocol (FTP). However, the application of the invention can also be obtained through any other commercial transaction. The originating computer 102 and the destination computer 104 can also retrieve identification data from the server 108 using the Hypertext Transfer Protocol (HTTP). As known to those skilled in the art, FTP is a protocol commonly used on the Internet to exchange copying and/or transferring files to and from remote computer systems, and HTTP is a protocol commonly used on the Internet to exchange information. As described in more detail below, identification data includes an application identification code and an Internet protocol address associated with a particular computer.

Figure 1A:
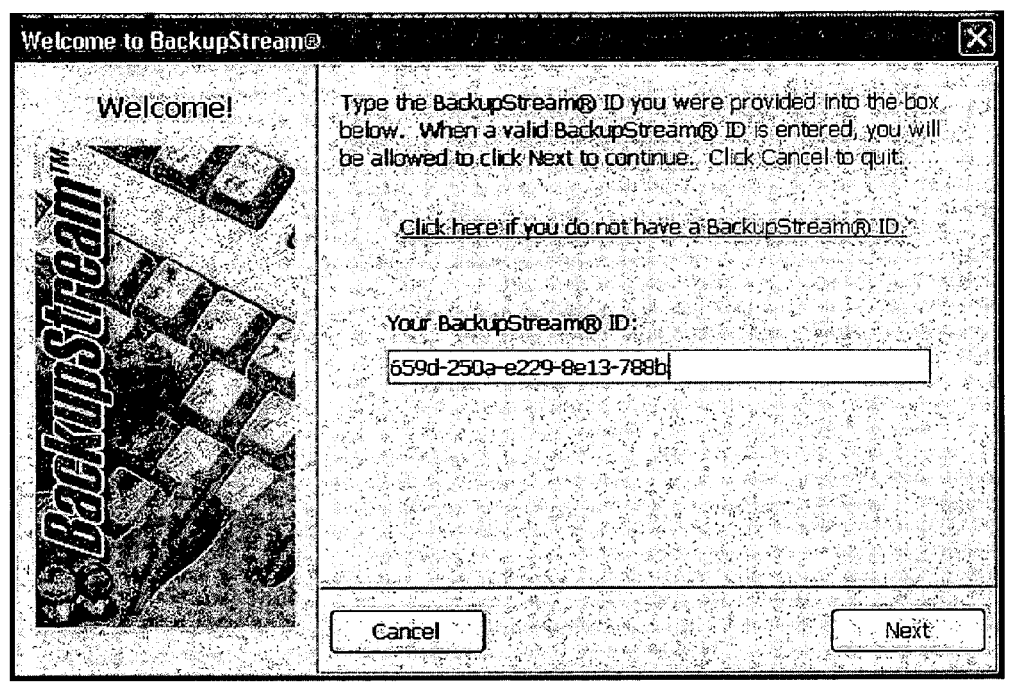
FIG. 1A is a screen shot illustrating an exemplary validation form of the invention.
Figure 1B:
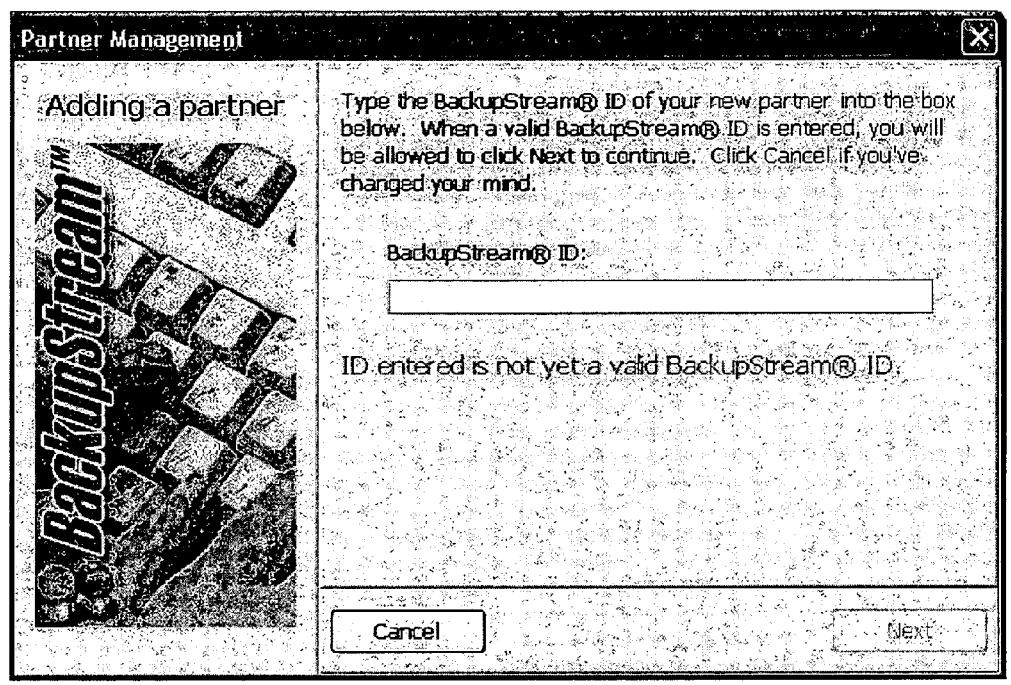
FIG. 1B is a screen shot illustrating an exemplary destination identification form of the invention.

The server 108 is coupled to a back-up database 131 that store identification data. For example, the back-up database 131 contains an Internet Protocol (IP) address and unique application identification code (ID) for each of the originating and destination computers. As known to those skilled in the art, the IP address uniquely identifies a computer when it is connected to the Internet via an Internet Service Provider (ISP). In one embodiment, after a user loads the application of the invention for use on a particular computer by downloading or other copying, the server 108 emails the user an application ID. The user then submits the application ID back to the server 108 via a validation form 140 such as illustrated in FIG. 1A to validate the application, and to associate the submitted application ID with the particular computer to which the application was downloaded. During this initial communication session, or any subsequent communication session, between computer and the server 108, the server 108 records and stores the IP address of the computer submitting the application ID in the back-up database 131. The server 108 also executes an assigning routine 133 to assign the submitted application ID to the computer from which the application ID was submitted. Thereafter, the application ID and corresponding IP address associated with that particular computer are maintained in the server database 131. As a result, the server 108 can be used to obtain an IP address associated with the destination computer 104. For example, the originating user 118 submits the destination ID to the server 108 via an identification form 142 such as shown in FIG. 1B to identify the IP address of the destination computer 104. The server 108 executes an identification program 136 to verify that the submitted application ID is valid, and then queries the server database 131 to identify the last known IP address associated with destination computer 104. As described below in FIG. 2, the destination ID and corresponding IP address are also maintained in the originating computer 102.

Moreover, the server 108 obtains the IP address of the originating computer 102 when the originating user is requesting the IP address of an existing partner. As known to those skilled in the art, ISP providers frequently change the IP address assigned to a particular computer. As a result, the originating computer 102 may not be able to establish a connection with the destination computer 104. To verify that the originating computer 102 has the correct IP address stored for the destination computer 104, the originating user 118 contacts the server 108 in order to obtain the last known IP address of the existing partner's computer. During this subsequent communications session between the originating computer 102 and the server 108, the server 108 again obtains and stores the IP address of the originating computer 102. Likewise, if the destination user 130 has sent a similar IP request to the server 108 for any computer sharing space with destination computer 104, the server 108 will also have the IP address of the destination computer at the time the IP request was made. Thus, the originating computer 102 can obtain the latest known IP address of the destination computer 104 from the server 108, and can attempt to establish a communication session with the destination computer 104 via the latest known IP address.

Notably, the server 108 is optional, as indicated by reference character 150, and is not necessary component of the back-up system 100 for transferring files between the origination and destination computers. In other words, if the originating computer 102 has the IP address of the destination computer stored in memory (e.g., originating database 204), the originating computer 102 can communicate directly with the destination computer, and there is no need to communicate with the server 108.

Figure 2:
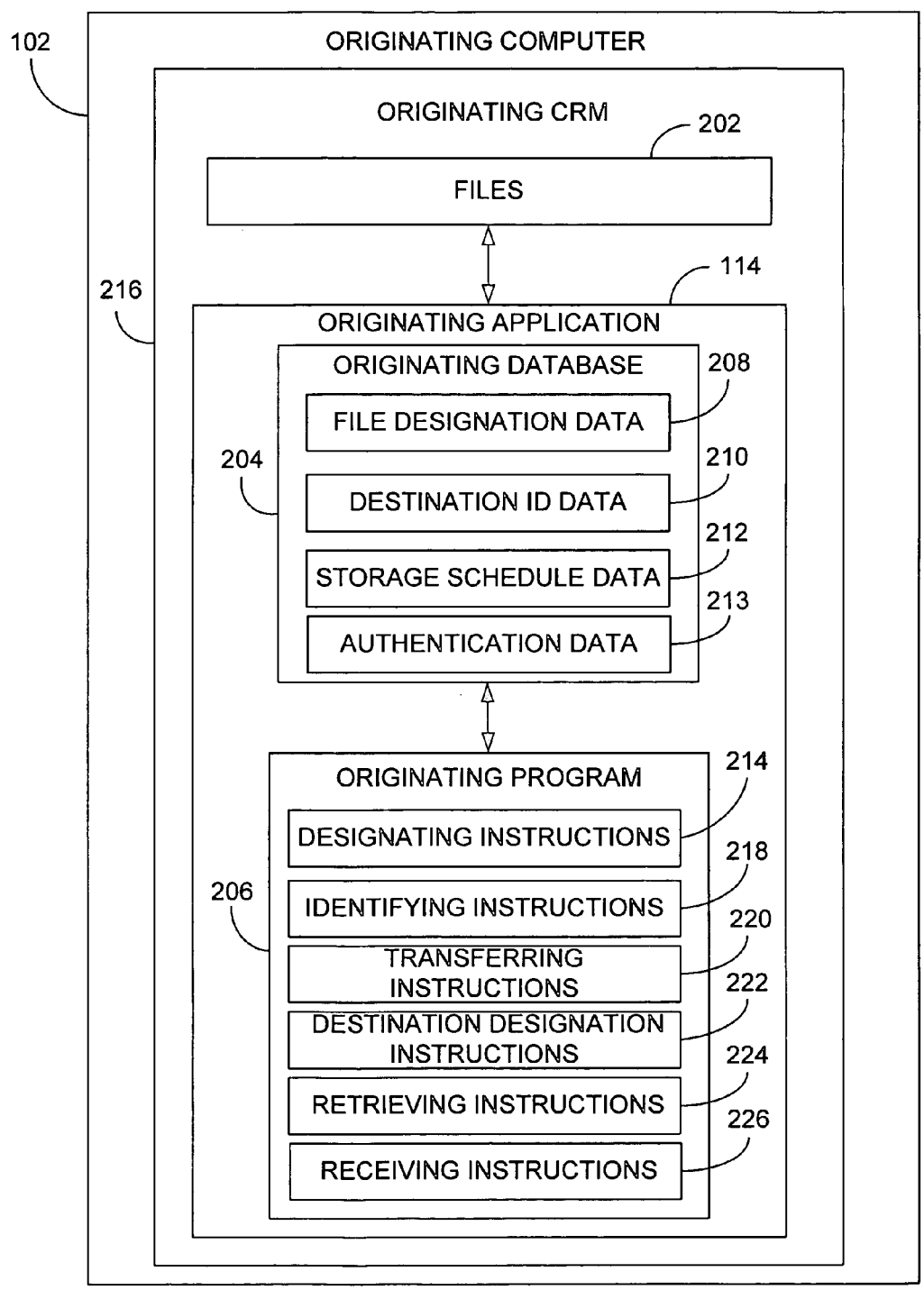
FIG. 2 is a block diagram illustrating the components of an application that allows files stored on the originating computer to be retrieved, encrypted and transferred to the destination computer.

Referring now to FIG. 2, a block diagram illustrates the components of a originating application 114 that allows files 202 (e.g., files 116) stored on the originating computer 102 to be designated, encrypted, and transferred to the destination computer 104 according to one preferred embodiment of the invention.

In this embodiment, the origination application 114 uses an originating database 204 and an originating program 206 to transfer copies of files 202 from the originating computer 102 to the destination computer 104. The originating database 204 stores file designation data 208, destination identification (ID) data 210, and storage schedule data 212, and authentication data 213. The originating program 206 includes originating designating instructions 214 for designating files to back-up (i.e., copy to destination computer), identifying instructions 218 for identifying the destination computer, and transferring instructions 220 for transferring the encrypted files 202 to the destination computer.

Figure 2A:
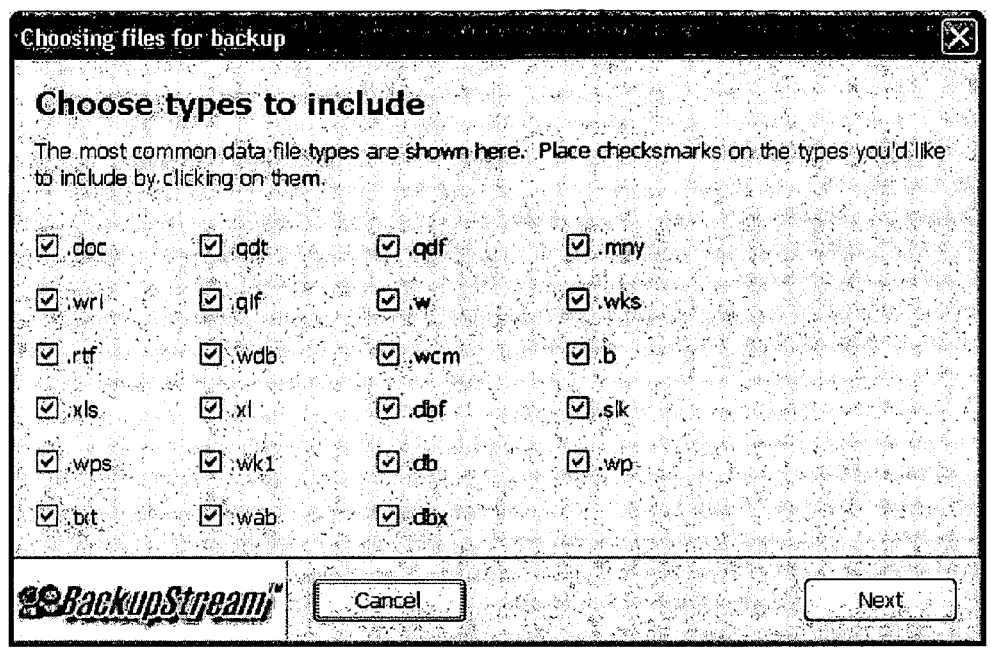
FIG. 2A is a screen shot illustrating an exemplary file designation form of the invention.

Originating designating instructions 214 include instructions for displaying a file transfer designation form 215 such as shown in FIG. 2A on the display 124. In this case, the file designation transfer form 215 allows the originating user 118 to select one or more file extensions (e.g., .txt, .doc, etc.). This allows the user to designate all files from the originating CRM 216 (e.g. CRM 112) having the one or more selected file extensions for copying to the destination computer 104. In alternate embodiment (not shown), the user selects files from a list files (e.g., file list box showing files on computer), or the user uses a keyboard to type a specific file name. The files 202 designated by the user are stored as file designation data 208 in the originating database 204.

Figure 2B:
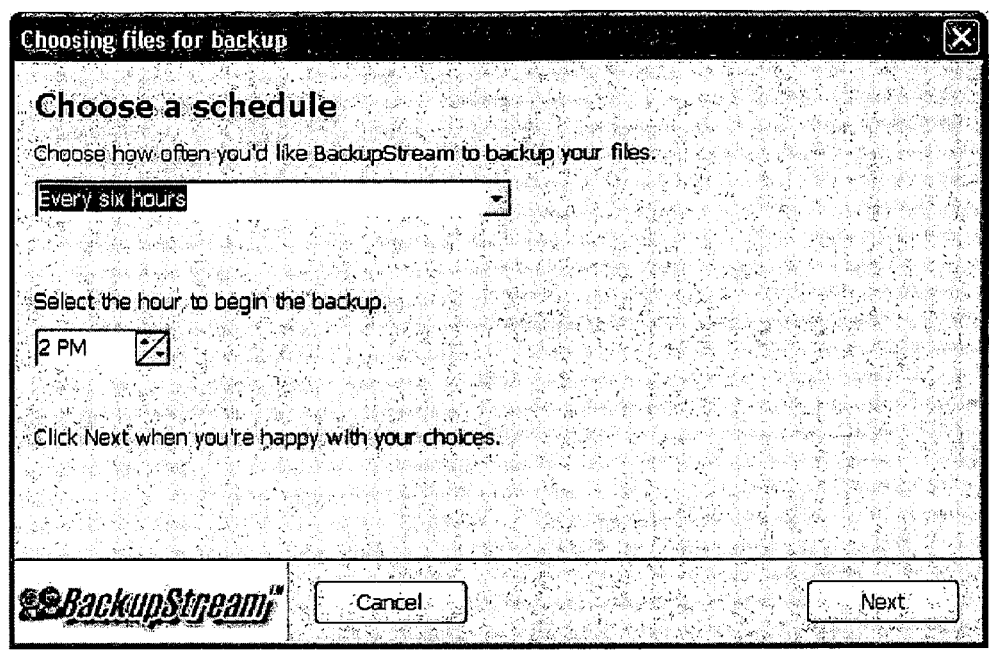
FIGS. 2B and 2C are screen shots illustrating an exemplary storage schedule forms of the invention.
Figure 2C:
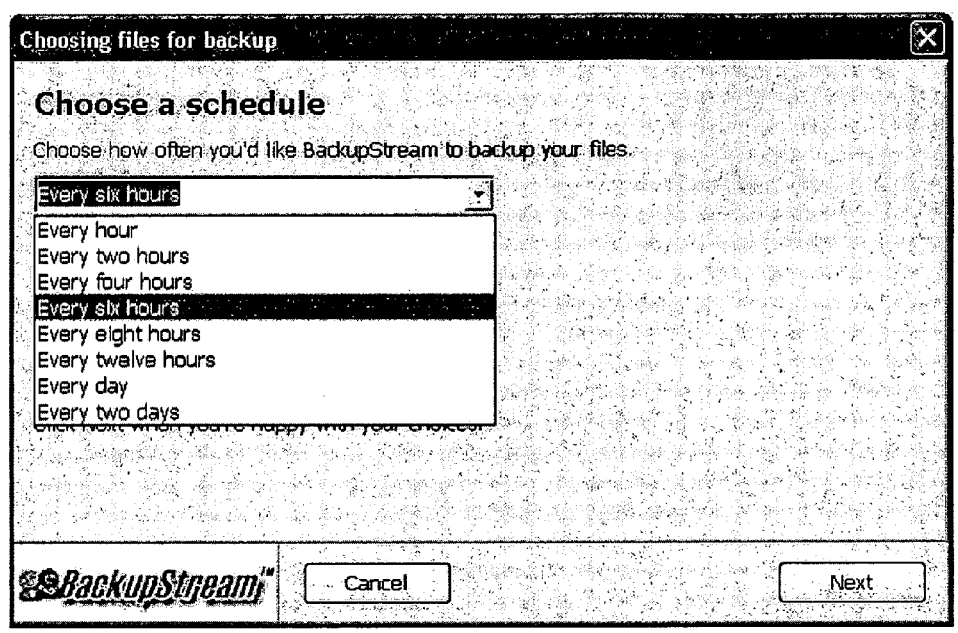

Originating designation instructions 214 also include instructions for displaying a storage schedule form 217, 219 such as shown in FIGS. 2B and 2C, respectively, to the user on the display 124. The storage schedule form 217 allows the user to designate storage schedule data 212. The storage schedule data 212 identifies one or more back-up times for transferring copies of designated files from the originating CRM 216 to the destination computer. For example, the originating user 118 uses the originating UI 120 to enter a specific time(s) of day, or time interval into the storage schedule form 217 to define a personal back-up schedule for one or more files designated for back-up on a particular destination computer 104. Importantly, it is not necessary to communicate to the partner the content, the subject matter, or any information about the files.

Identifying instructions 218 include instructions for displaying the destination identification form 142 (see FIG. 1B). The destination identification form 142 allows the user to identify the particular destination computer 104 to which to transfer copies the designated files. In this case, a "partner" (i.e., user of a particular destination computer) is identified and added to the originating database 204 by entering the unique application ID (i.e., destination ID) that corresponds to the particular originating application 114 stored on the destination computer 104. The originating user 118 obtains the application ID corresponding to the particular destination computer 104 (i.e., destination ID) by communicating (e.g., verbal communication, email, etc.) with the partner (i.e., destination user). As described above, the destination ID is a unique identification code assigned to the destination computer 104 when the originating application 114 is purchased or downloaded from the server 108. The destination ID provides access to the corresponding IP address of the destination computer 104 through a lookup function executed against the back-up database 131 maintained by the server (i.e., server database) or a third party.

Figure 2D:
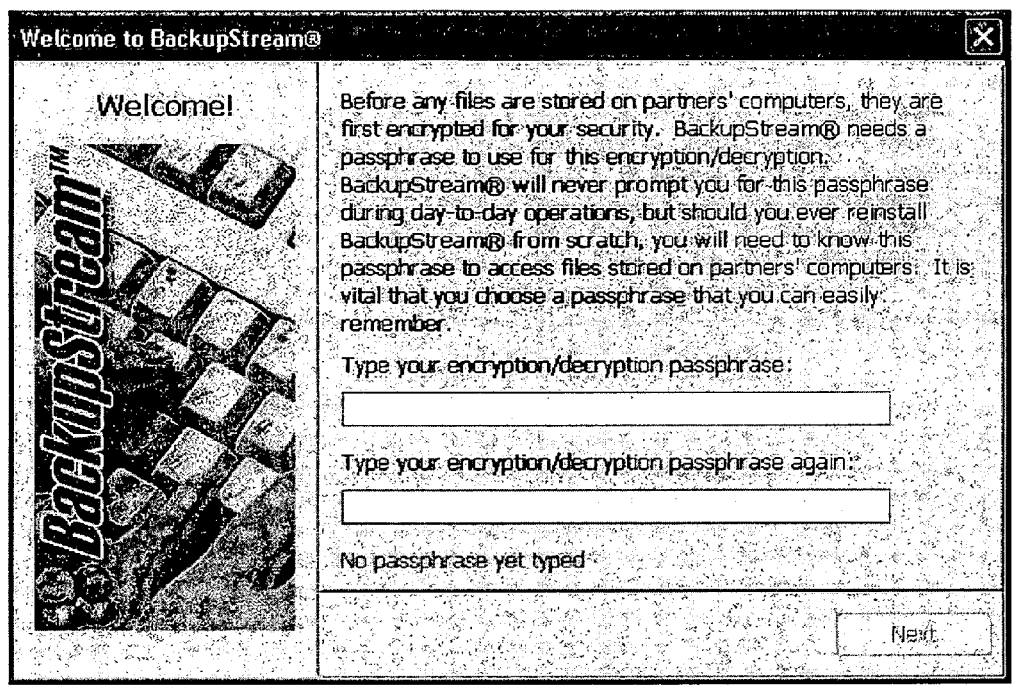
FIG. 2D is a screen shot illustrating an exemplary form for defining an encryption pass phrase.

Originating transferring instructions 220 include instructions for initiating a communication session with the destination computer 104 in response to input received from a user 118 to transfer copies of the designated files to the destination computer 104. Originating transferring instructions 220 also include instructions for encrypting the copies of the designating files prior to transferring copies to the destination computer 104. In one embodiment, the originating application 114 utilizes a Triple Data Encryption Standard (3DES) to secure (i.e., encrypt) the contents of the files prior to transfer. Before encryption instructions can be executed, the user must first supply a pass phrase via an encryption validation form 221 (see FIG. 2D) that is then cryptographically hashed and stored in the user's registry. Thereafter, the hashed pass phrase is used to encrypt and decrypt files stored on partners' computers. If the pass phrase is lost and cannot be remembered, the files stored remotely cannot be decrypted.

After the files have been encrypted, the transfer instructions 200 execute and read destination ID data 210 in the originating database 204 to identify the destination computer 104, and then transfers the encrypted copies of the designated files to the identified destination computer 104. Once stored on the destination computer 104, the encrypted files 128 are meaningless to the partner. Even the file names are "hash codes" that are only meaningful to originating computer. In other words, the partner cannot discern the content or names of the files that have been stored on the destination computer by the originating user. Although encrypting the files is not necessary, if encryption is not used, files stored on a given partner's computer may possibly be viewed with a hex editor or other utility.

Originating transferring instructions 220 also include instructions for automatically initiating a communication session with the destination computer 104 in response to storage schedule data. For example, after the originating user 118 assigns a schedule to a particular destination computer's (i.e., partner's) configuration, the originating computer 102 initiates a communication session with the destination computer 104 to transfer encrypted copies of the designated files. Thereafter, back up can occur automatically at the back-up time(s) specified in the storage schedule data. In one embodiment, automatic back-up only occurs on files that have been changed. Importantly, automatic back-up allows the transfer of encrypted copies of files 202 from the originating computer 102 to the destination computer 104 to take place without the users of computers 102, 104 being aware that the transfer is occurring.

Figure 2E:
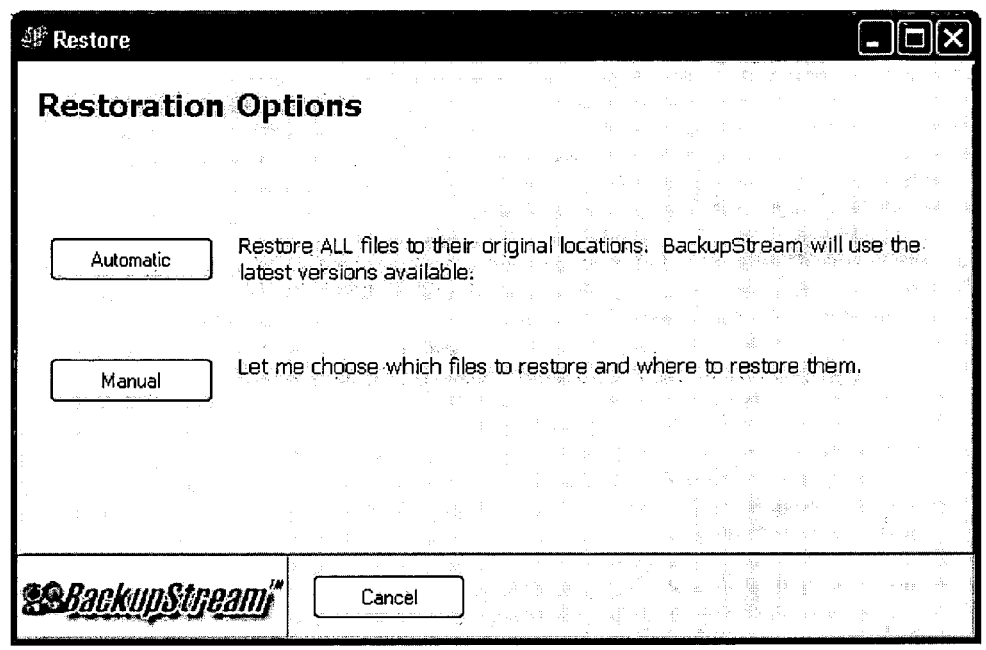
FIG. 2E is a screen shot illustrating an exemplary form for electing to retrieve a group of files or to retrieve individual files from storage.

The originating program 206 also includes destination-designating instructions 222 for designating files to retrieve from the destination computer 102, and retrieving instructions 224 for retrieving the designated files from the destination computer 104. Destination designating instructions 222 include instructions for displaying a file retrieval form 225 (see FIG. 2E) to allow the user to retrieve a group of files or individual files. File retrieval designation forms (not shown) are similar to file transfer designation forms. More specifically, the user can designate a group of files (e.g., files having the same file type extension) for retrieval (e.g., FIG. 2A), or the user can particular files by file name. The files entered or selected by the user 118 are then stored as destination file designation data 226 in the originating database 204.

Retrieving instructions 224 use the previously identified IP address associated with the particular application ID of the destination computer 104 to initiate a communication session between the originating computer 102 and the destination computer 104 to retrieve the designated files from the destination computer. As described above in reference to FIG. 1, if the IP address of the destination computer has changed, the originating application 114 can contact the server 108 and submit the previously obtained destination ID of the destination computer 104 to query the server's database 131 for the latest IP address of the destination computer 104. The server 108 not only delivers the last known IP address of the desired application ID, but also stores the IP address of the computer submitting the application ID. In this way, the server 108 maintains the latest IP address for that particular computer in the server database 131. In one preferred embodiment, the retrieving instructions 224 further include instructions for decrypting retrieved encrypted files. The originating application 114 can also utilize the Triple Data Encryption Standard (3DES) to decrypt the contents of the encrypted files.

Receiving instructions 226 include instructions for initiating a communication session with the destination computer 104 in response to a transfer request received from the destination computer 104 to transfer copies of the designated files on the destination computer 104 to the originating computer.

Figure 3:
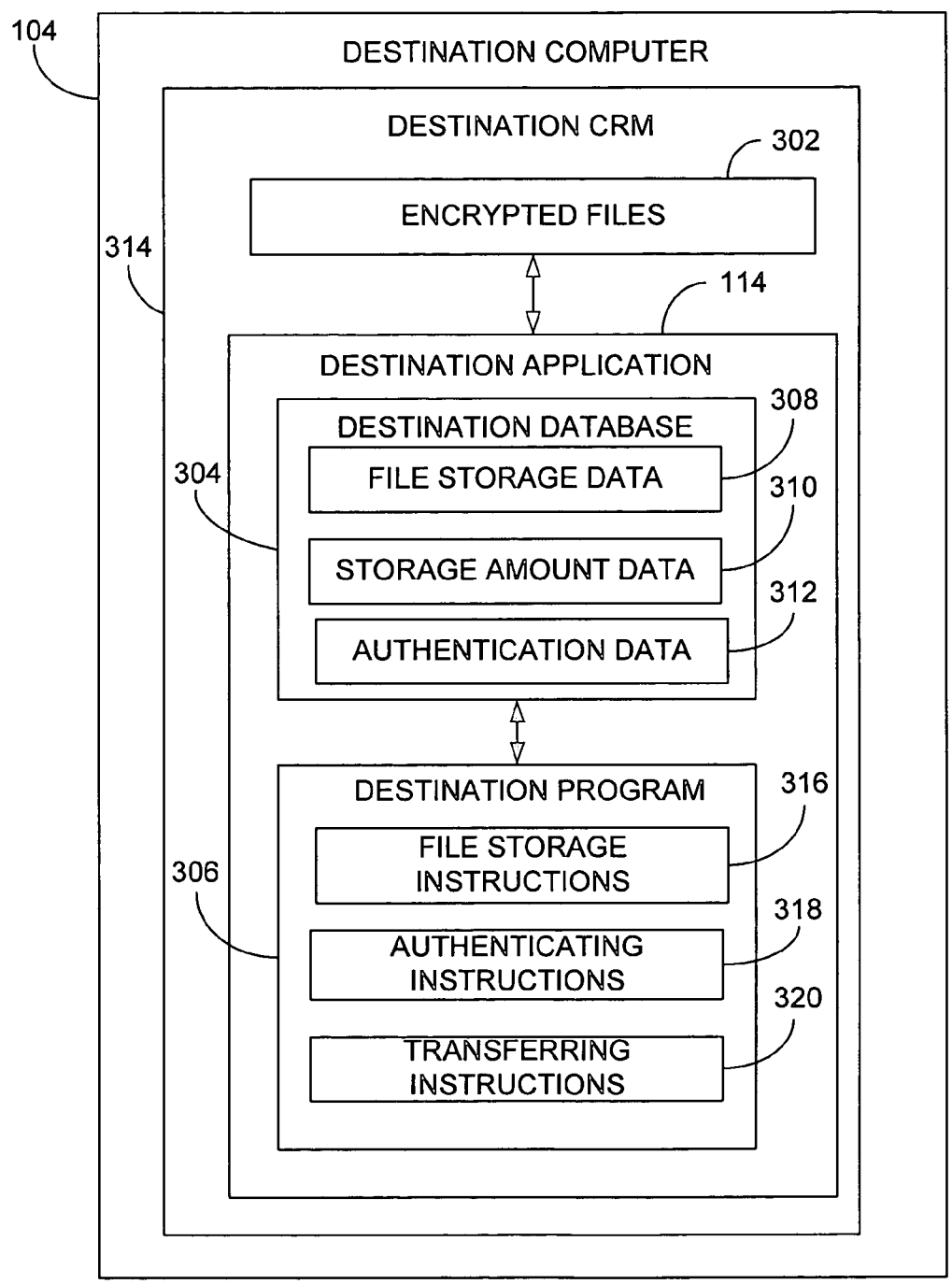
FIG. 3 is a block diagram illustrating the components of an application that allows encrypted copies of files stored on the destination computer to be transferred to an originating computer and decrypted.

Referring now to FIG. 3, a block diagram illustrates components of a destination application 115 allowing encrypted copies of files 302 received from an originating computer 102 to be stored on the destination computer 104.

Figure 3A:
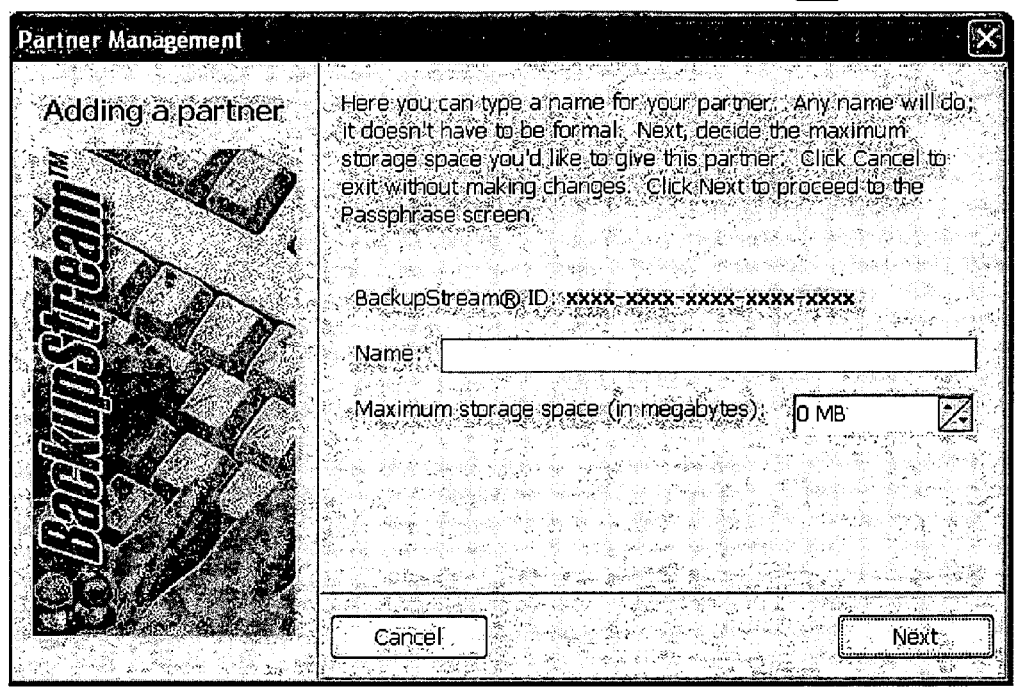
FIG. 3A is a screen shot illustrating an exemplary destination storage amount form of the invention.

In this embodiment, the destination application 115 uses a destination database 304, and a destination program 306 to store of back-up copies of files from the originating computer 102 onto the destination computer 104. The destination database 304 includes file storage data 308, storage amount data 310, and authentication data 312. File storage data 308 identifies encrypted files and/or post-transfer data regarding files received from the originating computer 102 and stored on the destination CRM 314 (e.g., CRM 122). For instance, post-transfer data includes the total amount of disk space currently being used to store back-up copies of files from the originating computer. The storage amount data 310 identifies an amount of storage space (i.e., disk space) on the destination CRM 314 that the destination user 130 has authorized for use by the originating user 118. The destination user 130 can allocate the originating user 118 a few megabytes or an entire hard drive of storage space on the destination computer 104. For example, the destination user 130 uses a storage amount form 315 such as shown in FIG. 3A to enter an amount of storage space that has been mutually agreed upon by both users 118, 130. The authentication data 312 includes authentication information used to verify that the originating user 118 is authorized to store files on the destination computer 104, and/or retrieve files from the destination computer 104.

The destination program 306 includes file storage instructions 316, authentication instructions 318, and transferring instructions. The destination program 306 can be executed by the destination user 130, or by the originating program 206. For instance, the destination user 130 executes the storage instructions 316 to define and authorize a maximum amount of storage space on the destination CRM 314 for storing files from the originating computer 102. In another embodiment, the storage instructions 316 include instructions for determining whether sufficient storage space is available on the destination CRM 314 to store copies of files from the originating computer 102. For example, upon execution, the storage instructions retrieve file storage data 308 identifying the amount of disk space currently being used to store copies of files from the originating computer 102 (e.g., post transfer data). The storage instructions 316 then compare the storage amount data 310 defined by the destination user 130 to the file storage data 308 to determine if storage space is available. If sufficient storage space is available, the one or more files are stored on the destination CRM 314. If sufficient storage space is not available, the storage instructions 316 display a message on the originating display that informs the originating user that there is insufficient storage space.

The originating user 118 executes the destination program 306 by executing the retrieval instructions 224. As discussed above in reference to FIG. 2, when the retrieving instructions 224 are executed, a communication link is established between the destination and originating computers to selectively retrieve one or more encrypted files. After the communication link is established, the retrieving instructions 224 read the destination file storage data 226 from the originating database 206, and retrieve one or more encrypted files from the destination CRM 314. Thereafter, the destination transferring instructions 320 transfers the designated encrypted files to the originating computer 102.

Figure 3B:
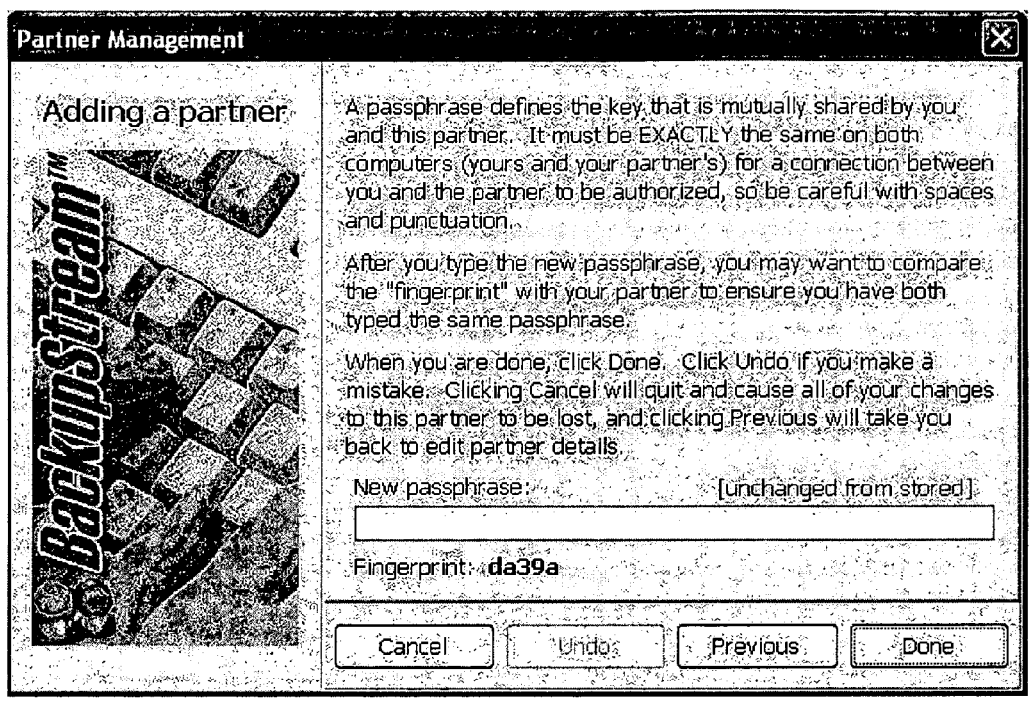
FIG. 3B is a screen shot illustrating an exemplary authentication form of the invention.

Authentication instructions 318 include instructions for determining whether the originating user 118 is authorized to store files on the destination CRM 314, and/or is authorized to retrieve files from the destination CRM 314. For example, when the originating computer 102 contacts the destination computer 104 for a communication session, the destination computer 104 executes authentication instructions 318. The authentication instructions 318 include instructions for retrieving previously defined authentication data such as a password. For example, after the originating user 118 and destination user 130 have agreed to become storage partners, they each define a mutually agreed pass phrase to store as authentication data in the originating database 204 and destination database 304, respectively. In one embodiment, an authentication form 321 such as shown in FIG. 3B is used by both users 118, 130 to enter the mutually agreed upon password. The authentication instructions 318 also include instructions for comparing the authentication data 213 stored in the originating database 204 to the authentication data 314 stored in the destination database 304. If the authentication data 213 stored in the originating database matches the authentication data 314 stored in the destination database 304, the originating application 114 is allowed to access the destination CRM 314 for file storage and/or file retrieval. By comparing the predefined authentication data, the user 118 is not required to enter a password during future back-up session between the originating computer 102 and the destination computer 104.

Referring now to FIG. 4, a flow chart illustrates a method for transferring back-up copies of one or more files from the originating computer 102 to the destination computer 104. At 402, the user uses UI 118 to designate files from the originating computer 102 for which to transfer copies to the destination computer 104. At an optional step 404, the user uses the UI 118 to define file parameter data for the designated files. For instance, the user may use the UI 118 to define back up schedule data. Back up schedule data includes specific times and/or intervals for transferring the designated files. As described above, authentication data may include a password, or pass phrase, that has been mutually agreed upon between partners. At 405, the user uses UI 118 to define identification data to identify the destination computer. Identification data includes a unique application ID (i.e., destination ID) that corresponds to the particular destination application 115 stored on the destination computer. At 406, the originating application 114 uses the identification data to determine the location of the destination computer 104. As described above, the destination ID provides access to the corresponding IP address of the destination computer 104 through a lookup function executed against the database 131 maintained by the server. At 408, the user uses the UI to define whether the transfer of back-up copies to the destination computer initiates manually or automatically. The originating application 114 determines whether the user has defined the transfer of back-up copies to occur manually or automatically at 409.

If the application determines the transfer of back-up copies is defined to occur manually at 409, the originating application 114 waits for the user to initiate a transfer request at 410. For example, the user uses a mouse to click a transfer button on a form (not shown) being displayed to the user via the display, and the originating computer request a communication session with destination computer having the identified IP address. The destination application 115 receives the transfer request at 411. At 412, the destination application 115 authenticates the transfer request to determine whether the originating computer is authorized to transfer files to the destination computer 104 for storage. As an example, authentication may involve comparing authentication data received from the originating computer along with the transfer request to authentication data stored on the destination computer 104. As described above in reference to FIG. 2, authentication data includes a password previously defined by users 118, 130 and stored in the originating database 204 and destination database 304, respectively. If authentication data from the originating computer 102 does not match the authentication data stored on the destination computer 104, the originating computer 102 is not authenticated at 412, and the destination application 115 alerts the user that the password is invalid at 413. If the entered password matches the authentication data stored on the destination computer 104, the originating user is authenticated at 412. In one embodiment, after the destination computer 104 receives a transfer request from the originating computer 102, the destination computer 104 generates a random number and sends it to the originating computer 104. The originating computer 102 performs a one-way hash function on the random number and the locally-stored password and sends the result back. The destination computer then computes the same function and compares the results. In this way, the originating computer can be authenticated without revealing the password. As known to those skilled in the art, a one way hash function is used to generate a cryptographically-secure message, and is a function that is easy to compute in the forward direction, but computationally infeasible to invert. After the originating computer is authenticated, the destination computer determines whether sufficient storage space is available for storing back-up copies at 414. For example, the destination compares the amount disk space required for storing the back-up copies to storage amount data defining an amount of disk space the destination user has allocated to the particular originating user. If sufficient storage space is determined available at 414, the back-up copies are stored on the destination computer at 416. If sufficient storage space is determined not available at 414, the originating user is alerted that there is insufficient storage space at 418.

If the application determines the transfer of back-up copies is defined to occur automatically at 409, the originating computer retrieves storage schedule data and authentication data, and automatically initiates a transfer request for transferring back-up copies of the designated files to the identified destination computer at the times defined by the storage schedule data at 419. The destination application 115 receives the transfer request at 420. At 422, the destination application 115 authenticates the transfer request to determine whether the originating computer 102 is authorized to transfer files to the destination computer for storage. Again, authentication may involve comparing authentication data stored on the originating computer 102 to authentication data stored on the destination computer 104. If the authentication data stored on the originating computer 102 does not match the authentication data stored on the destination computer 104, the originating computer is not authenticated at 422, and the destination application 115 alerts the user that the password is invalid at 424. If the authentication data stored on the originating computer 102 matches the authentication data stored on destination computer 104, the originating computer is authenticated at 420, and the destination application 115 determines whether sufficient storage space for storing back-up copies is available at 426. If sufficient storage space is available, the back-up copies are encrypted and stored on the destination computer at 428. If sufficient storage space is not available, the originating user is alerted that there is insufficient storage space at 430.

Figure 5:
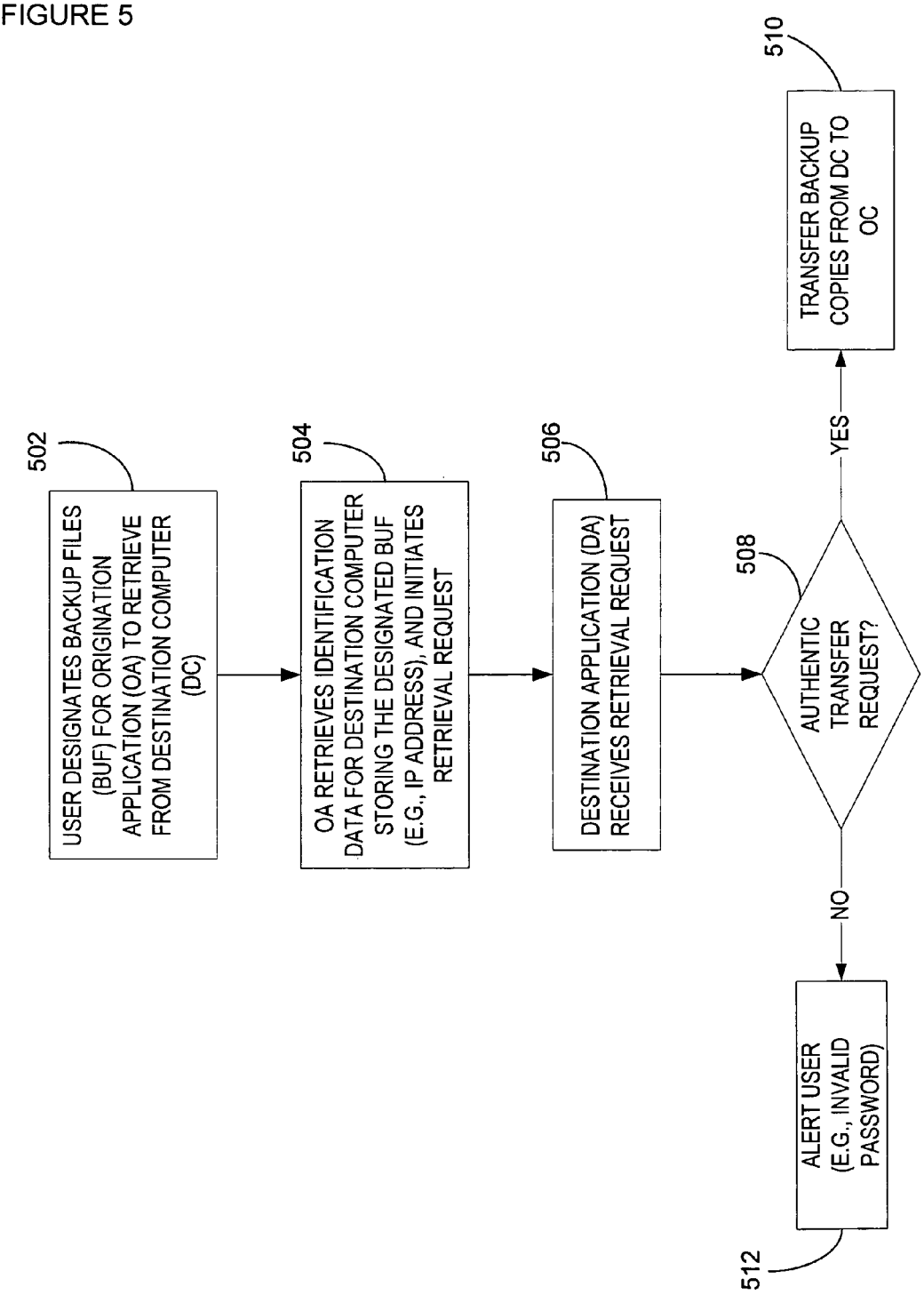
FIG. 5 is an exemplary flow diagram illustrating a method for retrieving back-up copies from a destination computer according to one preferred embodiment of the invention.

Referring now to FIG. 5, a flow chart illustrates a method for transferring back-up copies of one or more files from the destination computer 104 to the originating computer 102. At 502, the user uses UI 124 to designate files (e.g., back-up copies) to retrieve from the destination computer 104. At 504, the originating application 114 retrieves identification data stored in the originating database 108 to determine the location (i.e., IP address) of the destination computer 104, and submits a retrieval request to the identified destination computer 104 via the communication network. The destination application 115 receives the retrieval request for the designated files at 506. At 508, the destination application 115 authenticates the retrieval request. For example, authentication data stored on destination computer is compared to authentication data submitted from the originating computer along with the retrieval request. If the authentication data received from the originating computer 102 is determined to match authentication data stored on destination computer 104, the user is authenticated at 508, and the destination application 115 transfers the requested files to the originating computer for decryption at 510. If the authentication data received from the originating computer 102 is determined not to match authentication data stored on destination computer 104 the user is not authenticated at 508, and the user is alerted of that the authentication process has failed at 512.

Figure 6:
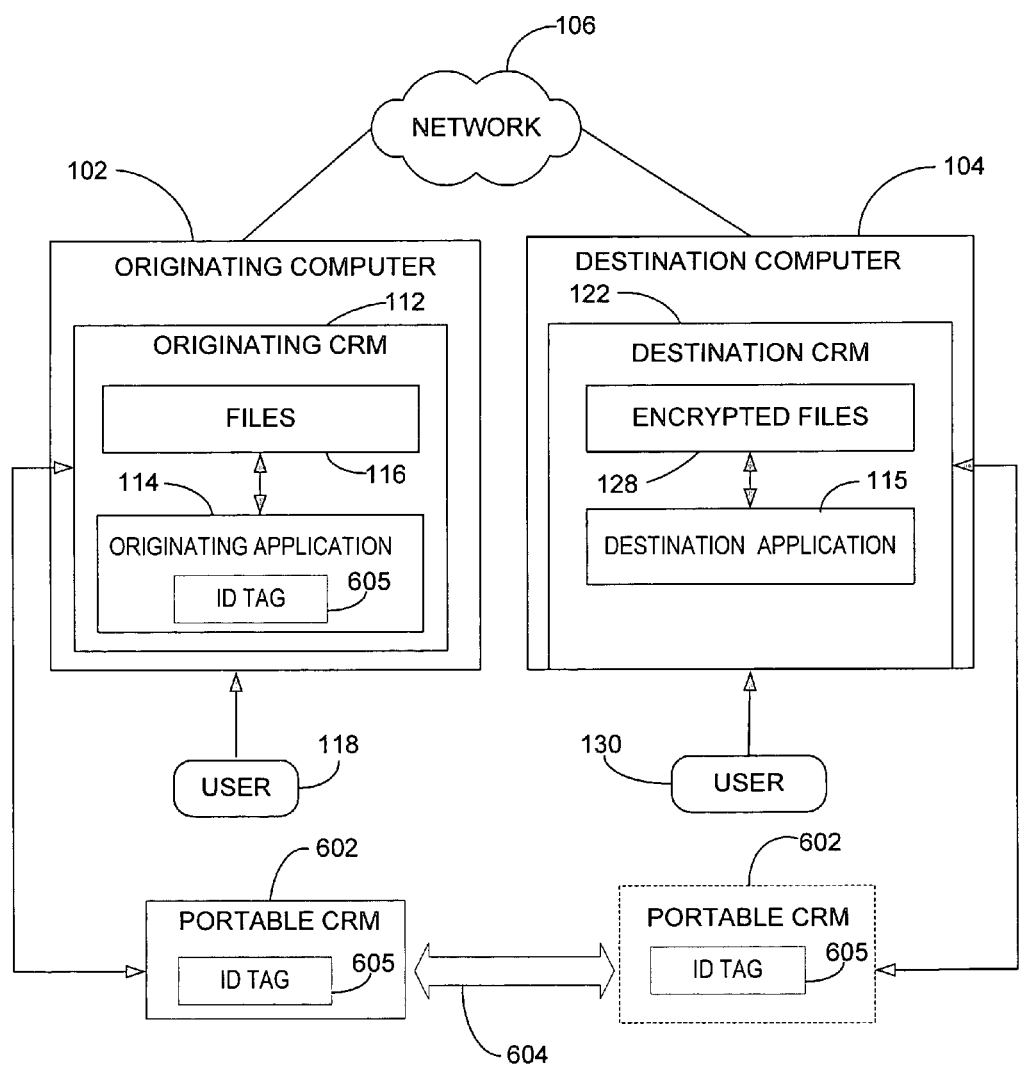
FIG. 6 is a block diagram illustrating a back-up system wherein initial copies of files stored on an originating computer are encrypted and stored on a portable medium for manual transfer to a destination computer.

Referring now to FIG. 6, a block diagram illustrates a back-up system 600 wherein copies of files stored on an originating computer are encrypted and stored on a portable medium for manual transfer to a destination computer.

As known to those skilled in the art, regardless of the connection type (e.g., broadband, dial-up, etc.) there are limits to the rate at which data can be transferred over communication networks such as the Internet. As a result, when the originating user 118 transfers large amounts of data (e.g., file data of 1 Gigabyte (GB) or more) to the destination computer 104 for back-up, the transfer may require several hours. Although the back-up stream system 100 allows data transfer to occur without the knowledge of destination user 130, due to the amount of time required for transferring large amounts of data, such transfers are more likely to be interrupted, for example, by a network time-out, or power interruption to either the originating computer 102 or the destination computer 104. In this embodiment, rather than transferring designated files directly to the destination computer 104 via the network 106, the originating user 118 initially transfers the designated files to a portable computer readable medium (portable medium) 602 such as zip drive, tape, Compact Disc (CD) or Digital Versatile Disk (DYD). For example, if the user desires to back-up files having a total file size that exceed 1GB, the user may decide to transfer the files via a portable medium due to a previous experience (e.g., network time out) while backing up files of similar size. In such a case, prior to transferring copies of the designated files to the portable medium 602, the originating application 114 executes originating transferring instructions 220, as described above in reference to FIG. 2, to encrypt copies of the designating files. Thereafter, the originating user 118 delivers the portable medium 602 having the encrypted file data to the storage partner (i.e., destination user 130), and the destination user 130 uploads or transfers the encrypted files from the portable medium 602 to the destination CRM 112. The delivery, as indicated by reference character 604, takes place, for example, via mail, courier service, or some other manual means of physically transporting the medium 602 from first a geographical location to a second geographical location.

The transfer instructions 200 also transfer authentication data from the originating computer 102 to the portable medium 602. Again, as described above in reference to FIG. 3, the authentication data 312 includes authentication information used to verify that the originating user 118 is authorized to store files on the destination computer 104, and/or retrieve files from the destination computer 104.

After the destination user 130 receives the portable medium 602, as indicated by phantom lines, the user 130 initiates transfer of the files stored on the portable medium 602 to the destination computer 130. As shown in FIG. 3, the destination application 114 includes file storage instructions 316. In this embodiment, the file storage instructions 316 include instructions for determining whether sufficient storage space is available on the destination CRM 314 to store copies of files stored on portable medium 602. The storage instructions 316 then compare the storage amount data 310 defined by the destination user 130 to the file storage data 308 to determine if storage space is available. If sufficient storage space is available, the one or more files are stored on the destination CRM 314. If sufficient storage space is not available, the storage instructions 316 display a message on the destination computer display to inform the destination user 130 that there is insufficient storage space. In response to such a message, the destination user 130 can allocate more storage space, as described above in reference to FIG. 3, or discontinue the transfer process and notify the originating user 118 that his or her storage capacity has been reached.

As described above in reference to FIG. 3, the destination application includes authentication instructions 318 for comparing the authentication data 213 stored in the originating database 204 to the authentication data 312 stored in the destination database 304. In this embodiment, authentication instructions 318 compare authentication data 312 transferred to the portable medium 602 from the originating computer 102 to the authentication data stored in the destination database 304. If the authentication data 213 stored in the originating database 204 matches the authentication data 314 stored in the destination database 304, the originating user 118 is authenticated to access the destination CRM 314 for file storage. By comparing the predefined authentication data, imposters or non-storage partners are prevented from tricking an unsuspecting destination user 130 into transferring unauthorized data onto the destination computer 104. Notably, when authentication data such as the mutually agreed upon passphrase is transferred to the portable computer readable medium, the method of delivery should be secured and/or trusted. If the method of delivery is not secure, the portable medium 602 could be lost or stolen, and thereby potentially recoverable by a malicious user.

In another preferred embodiment, after the originating user 118 elects to store data on a portable computer readable medium 602, the originating application 114 generates a unique identification tag (ID tag) 605. The ID tag 605 is used to identify a particular file or group of files being transferred to the portable computer readable medium at a particular time. In this embodiment, the ID tag 605 includes a randomly generated set of numbers and/or characters (e.g., key), and volume identification data. For example, a randomly generated alphanumeric value "AA0121" corresponds to a set of files the originating user transferred to the portable computer readable medium on Monday, Mar. 2, 2004, and the alphanumeric value "AB0132" corresponds to a next set of files that the originating user transferred to the portable computer readable medium on Mar. 20, 2004. Volume identification data identifies, a particular version of file data being transferred.

The originating application 114 stores the ID tag 605 in the originating database 204 of the originating computer 102, and the transferring instructions 220 transfer the ID tag 605, to the portable computer readable medium 602 for storage. As described above, after the destination user 130 initiates transfer of the files and file data, including the ID tag 605 from the portable medium 602 to the destination computer 130, the destination application 115 executes the authentication instructions 318. In this embodiment, the authentication instructions 318 include instructions for verifying that the originating user 118 desires to back-up the one or more files identified by the ID tag 605. More specifically, the authentication instructions 318 use the previously identified IP address associated with the particular application ID of the originating computer 102 to initiate a communication session, via the communication network 106, between the originating computer 102 and the destination computer 104. As described above, the application ID is a unique identification code assigned to the originating computer 102 when the originating application 114 is purchased or downloaded from the server 10, and provides access to the corresponding IP address of the originating computer 102 through a lookup function executed against the back-up database 131 maintained by the server (i.e., server database) or a third party. The authentication instructions 318 send the ID tag 605 obtained from the portable medium 602 back to the alleged originating computer 102 via the network 106, which then sends a reply back to the destination computer 104 via the network 106 either allowing the file copy transaction to occur or not to occur. The originating application 114 is responsive to the received ID tag 605 to query the originating database 204 for that particular ID tag 605. If the ID tag 605 is found, the originating application 114 displays, for example, a dialog box (not shown) on the display of the originating computer 102 listing the one or more files associated with the ID tag 605, and presents a message to the originating user 118 such as "ARE THES FILES AUTHORIZED FOR BACK-UP.". For example, if the user desires to proceed with back-up, the user 118 left clicks a "Yes" button in the dialog box, and a reply is sent to the destination computer 104 that the files are authorized for back-up. If the ID tag 605 is not found, or the user 118 does not wish to proceed with back-up (e.g., left clicks a "No" button in the dialog box), the originating application 114 sends a reply back to the destination computer 102, via the network 106, that the files are not authorized for back-up. This allows the originating user 118 to verify that the proper data set is attempting to be loaded on the destination computer. Moreover, this prevents the destination user 130 from maliciously or accidentally waiting a period of time (e.g., week, month, etc.) and transferring the data again, thereby potentially overwriting back-up data stored during the interim.

In another embodiment (not shown), the key portion (i.e., randomly generated number) of the ID tag 605 is used in a symmetric key encryption process to encrypt the contents of entire disc, and destination computer initiates a communication session with the originating computer 102 to requests the tag. In turn, the originating computer could either deny it (e.g., expired) or provide it, which would then allow the disc load to proceed.

Subsequent transfer of smaller data amounts can be transferred via the communication network, such as described above in reference to FIGS. 1-5. Moreover, transferring large amounts of data manually essentially jump-starts the transfer of smaller amounts of data over the communication network 106. In other words, small increments of data can be transferred in less time. In the event the originating user 118 loses significant amounts of data, the destination user 130 (i.e., storage partner) could transfer copies of encrypted files to the portable medium 602 and deliver it the originating user 118. Notably, although the destination user 130 can transfer data to or from the portable medium 602, the partner (i.e., destination user) cannot discern the content or names of the files that have been stored on the portable medium 602 by the originating user.

Figure 7:
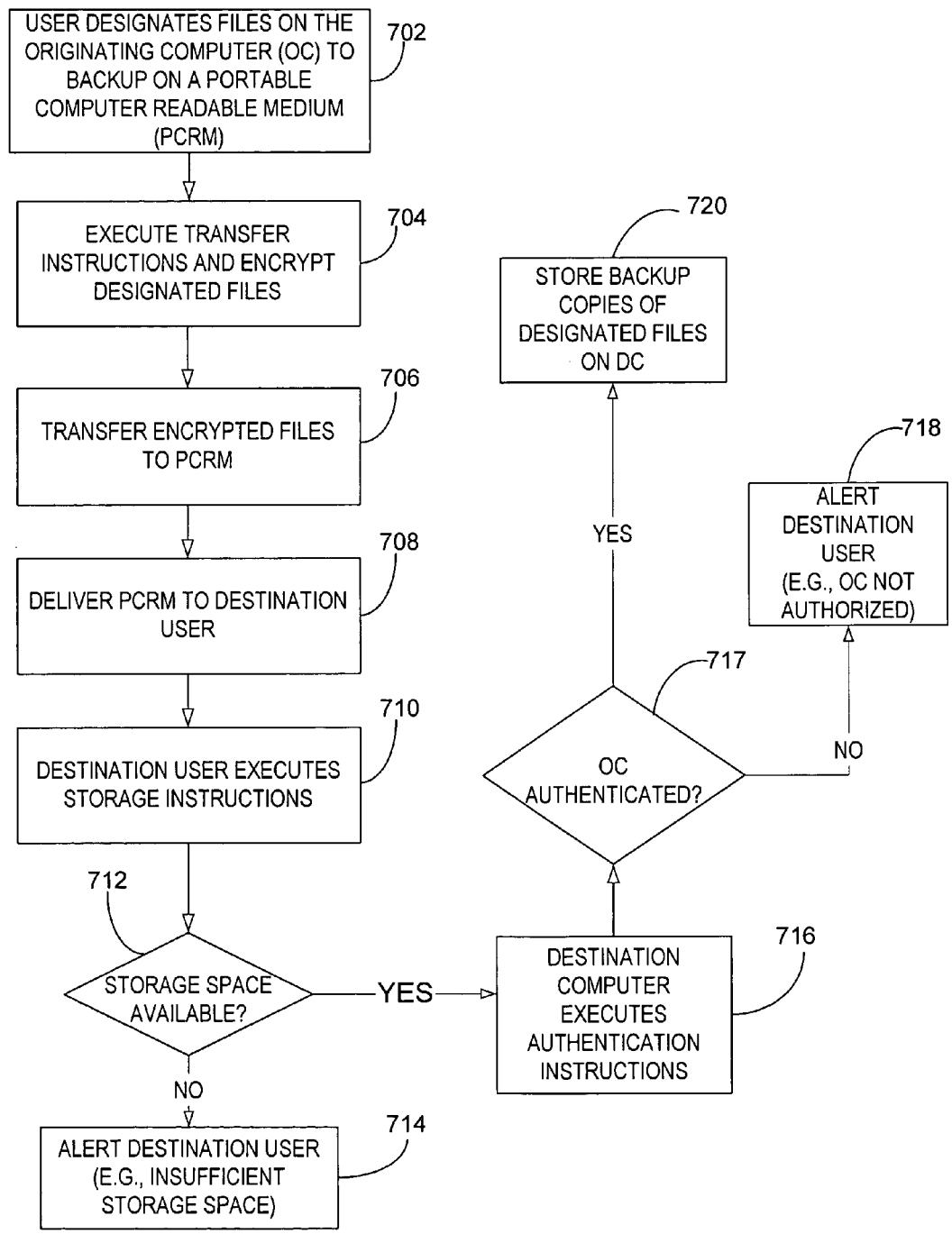
FIG. 7 is an exemplary flow chart illustrating a method for transferring back-up copies of one or more files from the originating computer to a portable storage medium for delivery to the destination user.

Referring now to FIG. 7, a flow chart illustrates a method for transferring back-up copies of one or more files from the originating computer 102 to a portable storage medium for delivery to the destination user. At 702, the originating user uses UI 120 to designate files (e.g., back-up copies) to transfer to a portable medium such as a CD. The originating application encrypts the designated files at 704. At 706, the encrypted files are transferred to the portable medium for storage. The portable medium is delivered to the destination user at 708. For example, the originating user sends the portable medium to the destination user via the United States Postal Service. At 710, the destination user executes storage instructions to upload the encrypted data stored on the portable medium to the destination computer for storage. The storage instructions determine whether sufficient storage space is available on the destination computer for storing the encrypted files stored on the portable medium at 712. If sufficient storage space is not available, the destination user is alerted that there is insufficient storage space at 714. If sufficient storage space is determined to be available at 712, the destination computer 104 executes authenticating instructions at 716 to authenticate (i.e., verify) that the originating computer 102 is authorized to store data on destination computer 104. As described above in reference to FIG. 2 and FIG. 4, authentication data includes a password previously defined by users 118, 130 and stored in the originating database 204 and destination database 304, respectively. If authentication data from the originating computer 102 does not match the authentication data stored on the destination computer 104, the originating computer 102 is not authenticated at 717, and the destination application 115 alerts the user 130 that the originating computer 102 is not authorized to store data at 718. If the entered password matches the authentication data stored on the destination computer 104, the originating computer 102 is authenticated at 717, and the encrypted files are transferred and stored on the destination computer at 720.

Figure 8:
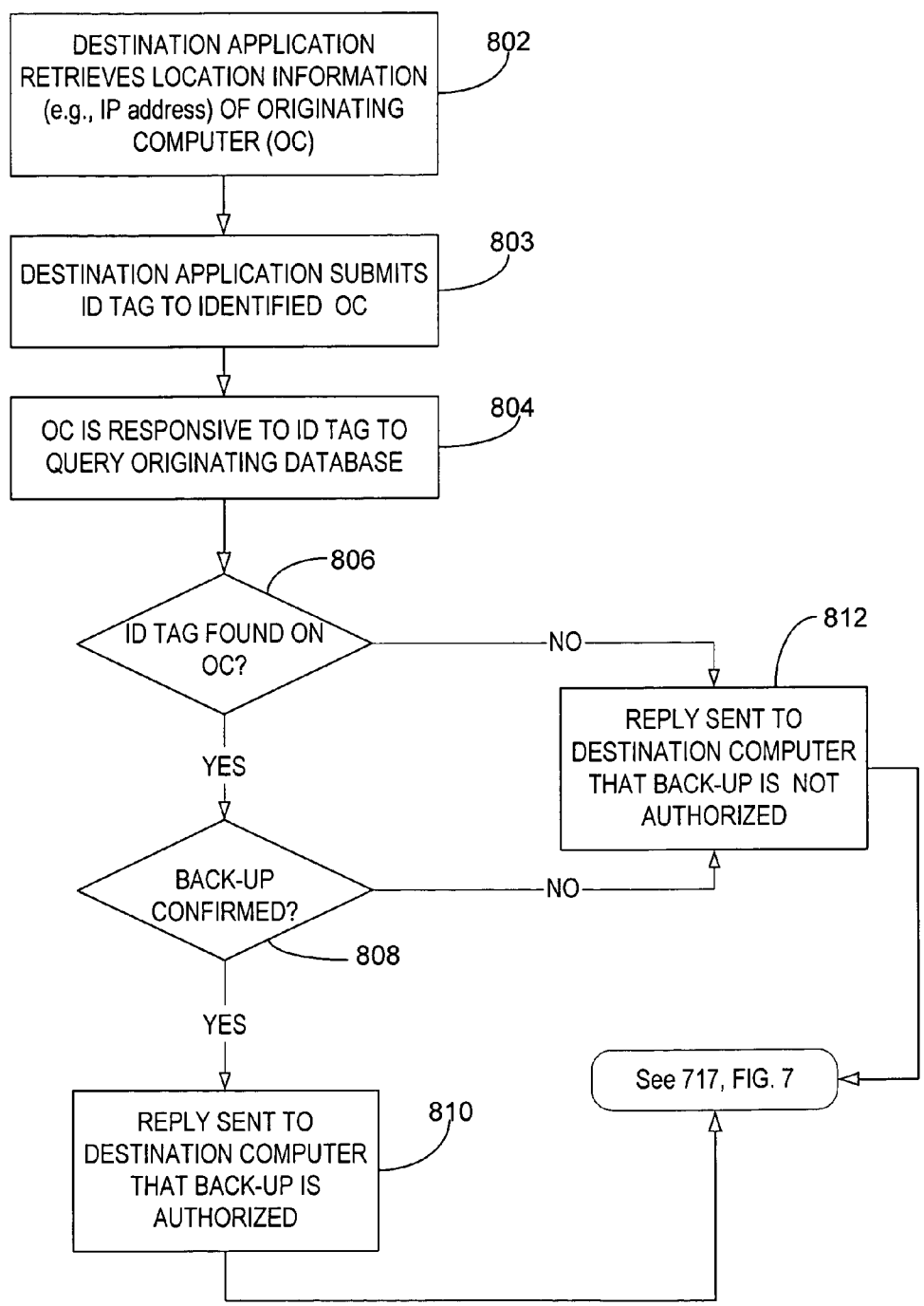
FIG. 8 is an exemplary flow chart illustrates a method for verifying that the originating user desires to transfer back-up copies of one or more files from the originating computer to a portable storage medium for delivery to the destination user.

Referring now to FIG. 8, a flow chart illustrates an additional method for authenticating that the originating user 118 desires to transfer back-up copies of one or more files from the originating computer 102 to a portable storage medium for delivery to the destination user. In addition to password authentication data, authentication data includes ID tag data. As described above in reference to FIG. 6, an ID tag 605 is stored in the originating database 204 of the originating computer and stored on the portable computer readable medium 602. In this case, after the destination user 130 executes storage instructions to upload the encrypted data stored on the portable medium 602 to the destination computer 104 for storage, the destination application 115 executes authentication instructions (See FIG. 7). At 802, the destination application 115 retrieves identification data stored on the portable computer readable medium 602 to determine the location (i.e., IP address) of the originating computer 102. The destination computer 104 submits an authentication request, which includes the ID tag 605, to the identified originating computer 104 via the communication network at 803. At 804, the originating computer 114 is responsive to the received ID tag 605 to query the originating database 204 for that particular ID tag 605. If the ID tag 605 is found at 806, the originating application 114 prompts the originating user 118 to confirm that back-up of the listed files is desired at 808. If the user 118 confirms that back-up of the listed files is desired at 808, the originating application 114 sends a reply back to the destination computer 104 via the network 106 that the files are authorized for back-up at 810. If the ID tag 605 is not found at 806, or the user 118 does not confirm that back-up of the listed files is desired at 808, the originating application 114 sends a reply back to the destination computer 104 via the network 106 that the files are not authorized for back-up at 810.

As various changes could be made in the above products and methods without departing from the scope of the invention, it is intended that all matter contained in the above description and shown in the accompanying drawings shall be interpreted as illustrative and not in a limiting sense.

What is claimed is:

1. A tangible computer readable storage medium having computer executable instructions being executed by a processor for facilitating the transfer of back-up copies of one or more files from a first computer to a second computer via a communications network including the Internet or via a portable computer readable storage medium, comprising:

instructions for designating files from the first computer for which back-up copies will be transferred to the second computer, said first computer and said second computer being Internet-enabled;

instructions for receiving, at the first computer, user input defining destination identification data;

instructions for identifying an Internet location of the second computer as a function of the defined identification data;

instructions for determining a total size of the designated files being transferred from the first computer to the second computer;

instructions for indicating whether to transfer the designated files from the first computer to the second computer via the network or whether to transfer the files from the first computer to the second computer via the portable computer readable storage medium based on the determined total size of the designated files being transferred;

instructions for selectively transferring, based on the instructions for indicating, the designated files from the first computer to the second computer via the network or from the first computer to the second computer via the portable computer readable medium;

wherein either the designated files are directly transferred from the first computer to the second computer at the identified location via the Internet and not via the portable computer readable storage medium or the designated files are transferred from the first computer to the second computer via the portable computer readable storage medium and not via the Internet.

2. The medium of claim 1, wherein instructions for designating files includes instructions for displaying a first input form on a display linked to the first computer, said first input form receiving input data from a user, and said input data designating the one or more files to be copied and transferred to the second computer.

3. The medium of claim 1, wherein instructions for selectively transferring files include instructions for encrypting the designated files prior to transferring the designated files to the portable computer readable storage medium or to the second computer.

4. The medium of claim 1 wherein instructions for selectively transferring files further includes transferring authentication data to the portable computer readable storage medium when the designated files are transferred from the first computer to the second computer via the portable computer readable storage medium and not via the Internet.

5. The medium of claim 4, wherein the instructions for receiving includes retrieving first authentication data from the portable computer readable storage medium and instructions for retrieving second authentication data from the second computer, wherein said first authentication data defines a first password and said second authentication data defines a second password, and instructions for comparing the first password to the second password to determine if the passwords match, and wherein the one or more files are stored on the second computer if the first and second passwords are determined to match.

6. The medium of claim 5 further including instructions for:

retrieving, at the second computer, a first identification tag from the portable computer readable storage medium, said identification tag being randomly generated by the first computer to identify the one or more files to be transferred from the portable computer readable storage medium to the second computer;

sending an authentication request including the first identification tag to the first computer via the communication network;

receiving, at the first computer, the authentication request and the first identification tag;

comparing, at the first computer, the received first identification tag with an second identification tag being stored on the originating computer to determine if the tags match, wherein the second identification tag corresponds to a tag previously generated by the first computer to identify a particular file or particular set files being transferred to a portable computer readable storage medium;

requesting, at the first computer, input from an originating user to confirm back-up is authorized if there is a matching tag;

sending a reply including the user input to the second computer via the communication network; and determining whether the first computer is authorized as a function of the user input included in the reply.

7. The medium of claim 1 wherein instructions for storing files includes instructions for retrieving storage amount data and file storage data from a destination database, said storage amount data defining a maximum amount of storage space available on the second computer for storing files transferred from the first computer, and said file storage data specifying a current amount of storage space on the second computer being used for storing files from the first computer, and wherein instructions for storing files further comparing the storage amount data to file storage data to determine if storage space is available, and wherein the back-up copies of the one or more designated files stored on the portable computer readable storage medium are stored on the second computer if storage space is determined to be available.

8. The medium of claim 1, wherein instructions for designating files for transfer further includes instructions for:
- designating a destination identifier associated with the second computer;
- designating storage schedule data for back-up copies; and
- storing the back-up copies of the designated one or more files, the designated destination identifier, and/or the designated storage schedule data in an originating database.

9. The medium of claim 8, wherein instructions for designating files includes instructions for displaying a first input form on a display linked to the first computer, said first input form receiving input data from a user, and said input data designating the one or more files to be copied and transferred to the second computer, designating the one or more back-up times, and/or designating the destination identifier.

10. The medium of claim 1 further comprising instructions for:
- identifying one or more stored files on the second computer in response to a retrieval request received from the the first computer;
- determining a total size of the stored files to be retrieved and being transferred from the second computer to the first computer;
- indicating whether to transfer the designated files from the second computer to the first computer via the network or whether to transfer the files from the second computer to the first computer via the portable computer readable storage medium based on the determined total size of the files being transferred; and
- transferring based on the indicating the designated files from the first computer to the destination computer via the Internet and not via the portable computer readable storage medium or transferring the designated files from the first computer to the portable computer readable storage medium and not via the Internet.

11. A tangible computer readable storage medium having computer executable instructions being executed by a processor for facilitating the transfer of back-up copies of one or more files from a first computer via a communications network including the Internet to a destination computer remote from the first computer comprising:
- designating files from the first computer for which back-up copies will be transferred to the destination computer;
- instructions for receiving, at the first computer, user input defining a destination identification data;
- instructions for identifying a location of the destination computer as a function of the defined identification data;
- instructions for determining a total size of the designated files being transferred from the first computer to the destination computer;
- instructions for indicating whether to transfer the designated files from the first computer to the destination computer via the network or whether to transfer the files from the first computer to the destination computer via the portable computer readable storage medium based on the determined total size of the files being transferred;
- instructions responsive to the indicating instructions for transferring the designated files from the first computer to the destination computer via the Internet or for transferring the designated files from the first computer to a portable computer readable storage medium and from the portable computer readable storage medium to the destination computer.

12. The medium of claim 11 further comprising instructions for permitting a user of the first computer to specify a target amount of storage space
- wherein the designated files are transferred from the first computer to the destination computer via the Internet when a total size of the designated files are less that the user specified target amount and wherein the designated files are not transferred from the first computer to a portable computer readable storage medium when the total size of the files is less than the user specified target amount and wherein the designated files are not transferred from the portable computer readable storage medium to the destination computer when the total size of the files is less than the user specified target amount; and
- wherein the designated files are not transferred from the first computer to the destination computer via the Internet when the total size of the designated files is greater that the user specified target amount and wherein the designated files are transferred from the first computer to a portable computer readable storage medium when the total size of the designated files is greater than the user specified target amount and wherein the designated files are transferred from the portable computer readable storage medium to the destination computer when the total size of the designated files is greater than the user specified target amount.

13. A computer implemented method for facilitating the transfer of back-up copies of one or more files from a first computer via a communications network including the Internet to a destination computer at a remote location from the first computer, comprising:
- identifying a first computer;
- identifying a destination computer;
- providing a portable computer readable storage medium removable and separate from the first computer and the destination computer;
- designating files from the first computer for which back-up copies will be transferred to the destination computer;
- receiving, at the first computer, user input defining destination identification data;
- identifying a location of the destination computer via the Internet as a function of the defined identification data;
- determining a total size of the designated files being transferred from the first computer to the destination computer;
- indicating whether to transfer the designated files from the first computer to the destination computer via the network or whether to transfer the files from the first computer to the destination computer via the portable computer readable storage medium based on the determined total size of the files being transferred;
- in response to the indicating, transferring the designated files from the first computer to the destination computer via the Internet and not via the portable computer readable storage medium or transferring the designated files from the first computer to the portable computer readable storage medium and not via the Internet; and
- when the designated files are transferred to the portable computer readable storage medium, and when the portable computer readable storage medium including the designated files transferred from the first computer has been transferred to the remote location of the destination computer, transferring the designated files from the portable computer readable medium to the destination computer.

14. The method of claim 13 further comprising designating by a user of the first computer a target amount of total size wherein when the instructions for determining indicate that the total size of the designated files being transferred from the first computer to the destination computer is less than the target amount, the designated files are transferred from the first computer to the destination computer via the network and wherein when the instructions for determining indicate that the total size of the designated files being transferred from the first computer to the destination computer is greater than the target amount, the designated files are transferred from the first computer to the destination computer via the portable computer readable storage medium.

15. The method of claim 14 further comprising identifying files on the destination computer to be restored to the first computer including:
   transferring the files to be restored from the destination computer to the first computer via the Internet when a total size of the files being transferred is less than the target amount;
   receiving at the first computer the transferred files to be restored via the Internet;
   transferring the files to be restored from the destination computer to the portable computer readable storage medium when the total size of the files being transferred is greater than the target amount; and
   receiving at the first computer the transferred files to be restored via the portable computer readable storage medium.

16. A computer implemented method for facilitating the transfer of back-up copies of one or more files from a first computer via a communications network including the Internet to a destination computer, comprising:
   identifying a first computer;
   identifying a destination computer;
   providing a portable computer readable storage medium removable and separate from the first computer and the destination computer;
   using a first computer readable storage medium for:
   designating files from the first computer for which back-up copies will be transferred to the destination computer, said designating by the first user of the first computer;
   receiving, at the first computer, user input defining destination identification data;
   identifying by the first user of the first computer a location of the destination computer via the Internet as a function of the defined identification data;
   determining a total size of the designated files being transferred from the first computer to the destination computer;
   indicating whether to transfer the designated files from the first computer to the destination computer via the network or whether to transfer the files from the first computer to the destination computer via the portable computer readable storage medium based on the determined total size of the files being transferred;
   in response to the indicating transferring the designated files from the first computer to the destination computer via the Internet and not via the portable computer readable storage medium or transferring the designated files from the first computer to the portable computer readable storage medium and not via the Internet;
   using a second computer readable storage medium for:
   receiving at the destination computer the transferred files from the first computer via the Internet and not via the portable computer readable storage medium; and
   receiving at the destination computer the transferred files from the portable computer readable storage medium and not via the Internet.

17. A tangible computer readable storage medium having computer executable instructions being executed by a processor for facilitating the transfer of back-up data of files or folders via the Internet from a first computer to a destination computer remote from the first computer, wherein the back-up data are determined to be too large to initially transfer via the Internet, said medium comprising:
   instructions for designating files or folders from the first computer for which back-up data will be transferred to the destination computer;
   instructions for identifying a location of the destination computer;
   instructions for determining a total size of the designated files being transferred from the first computer to the destination computer;
   instructions for indicating whether to transfer the designated files from the first computer to the destination computer via the network or whether to transfer the files from the first computer to the destination computer via the portable computer readable storage medium based on the determined total size of the designated files being transferred;
   instructions for initially transferring the designated files or folders from the first computer to a portable computer readable storage medium so that the files or folders are capable of being transferred from the portable computer readable storage medium to the destination computer wherein the designated files or folders are not initially transferred via the Internet;
   instructions for subsequently transferring back-up data of the designated files or folders from the first computer to the destination computer via the Internet and not via the portable computer readable storage medium.

18. The medium of claim 17 wherein the instructions for receiving, at the second computer, include:
   instructions for transferring the files from the portable computer readable storage medium to the second computer for storage.

* * * * *